United States Patent [19]

Rahmlow

[11] Patent Number: 5,523,882
[45] Date of Patent: Jun. 4, 1996

[54] RUGATE FILTER HAVING SUPPRESSED HARMONICS

[75] Inventor: Thomas D. Rahmlow, Bethleham, Conn.

[73] Assignee: Hughes Aircraft Company, Los Angeles, Calif.

[21] Appl. No.: 469,601

[22] Filed: Jun. 6, 1995

Related U.S. Application Data

[63] Continuation of Ser. No. 229,847, Apr. 18, 1994, abandoned, which is a continuation of Ser. No. 58,609, May 6, 1993, abandoned.

[51] Int. Cl.⁶ .................................................... G02B 5/28
[52] U.S. Cl. .......................... 359/580; 359/586; 359/589
[58] Field of Search .................................. 359/580, 582, 359/586, 589, 378

[56] References Cited

U.S. PATENT DOCUMENTS

| | | | |
|---|---|---|---|
| 4,583,822 | 4/1986 | Southwell | 359/586 |
| 4,826,267 | 5/1989 | Hall et al. | 359/586 |
| 4,934,788 | 6/1990 | Southwell | 359/586 |
| 4,952,025 | 8/1990 | Gunning, III | 359/586 |
| 4,958,892 | 9/1990 | Jannson et al. | 359/580 |
| 5,009,485 | 4/1991 | Hall | 359/586 |
| 5,056,009 | 10/1991 | Bradley | 359/580 |
| 5,181,143 | 1/1993 | Southwell | 359/586 |
| 5,225,930 | 7/1993 | Land et al. | 359/578 |
| 5,258,872 | 11/1993 | Johnson et al. | 359/580 |
| 5,291,332 | 3/1994 | Siebert | 359/586 |
| 5,293,548 | 3/1994 | Siebert | 359/586 |

FOREIGN PATENT DOCUMENTS

85/01115  3/1985  WIPO.

OTHER PUBLICATIONS

W. H. Southwell, "Rugate Index Profile Which Suppresses All Harmonic Stopbands," Optical Society of America, Technical Digest, Topical Meeting on Optical Interference Coatings, pp. 142 to 147 (1988).

*Primary Examiner*—Martin Lerner
*Attorney, Agent, or Firm*—W. C. Schubert; W. K. Denson-Low

[57] ABSTRACT

A rugate filter (10) having suppressed harmonics includes a layer (18) of material disposed on a surface (14) of an optical substrate (12) having an index of refraction versus thickness profile that is the superposition of a principle sinusoid and a secondary sinusoid. The secondary sinusoid being superimposed about −90 degrees out of phase with the principle sinusoid.

11 Claims, 5 Drawing Sheets

RUGATE FILTER HAVING SUPPRESSED HARMONICS

This is a continuation application of Ser. No. 08/229,847 filed 18 Apr. 1994, now abandoned that is a continuation application of Ser. No. 08/058,609 filed 6 May, 1993, now abandoned.

BACKGROUND OF THE INVENTION

The present invention generally relates to rugate filters and, in particular, relates to one such rugate filter having suppressed harmonics.

Conventional optical filters are usually fabricated by applying a plurality of discrete layers of material to an optical substrate. The material of each of the layers is selected so that there is a change in the index of refraction at every interface. More specifically, the material of the layers is chosen so that the index of refraction alternates from a comparatively higher (or lower) value to a comparatively lower (or higher) value at each layer interface.

As known in the field of optics, when light impinges upon any interface where there is a difference in the index of refraction some of the incident light will be reflected. Further, at an interface whereat the incident light traverses from a material of relatively high index of refraction to a material of relatively low index of refraction a phase change of 180 degrees is introduced into the reflected light. Hence, there is, with the appropriate choice of layer thickness, destructive cancellation of the reflected light at consecutive interfaces. Consequently, the more interfaces an incident light beam traverses, the greater the amount of the incident light reflected and canceled. When substantially all of the light of a particular wavelength is reflected and canceled before reaching the optical substrate, that wavelength of light can be said to have been filtered, or rejected, from the incident light beam. It is known and understood that, with such stacked arrangements, not only is the principle wavelength rejected but the harmonics thereof are also rejected.

More recently, rugate filters have been developed. In the case of rugates, rather than forming a plurality of discrete layers of material onto an optical substrate, a single layer of material is formed in such a fashion that the index of refraction varies within the layer itself. Typically, such rugates are effected by a continuous deposition process during which one or more of the materials deposited are varied. Hence, the variation of the index of refraction.

In one particular application, i.e., single wavelength rejection filters, the typical rugate will have an index of refraction versus optical thickness profile through the layer that is sinusoidal. As used herein the term "optical thickness" is taken to mean the product of the mechanical thickness and the index of refraction. However, other profiles can be implemented depending upon the optical characteristics desired. In general, multiple reflection bands can be generated by superimposing the individual refractive index profiles and depositing the resulting profile. For example, if a number of wavelengths are to be suppressed, the profile of the final rugate would be the resultant profile of the sum of the individual profiles desired.

One of the advantages of rugates is that the resultant layer is quite thin. In fact, the typical rugate layer is sufficiently thin that incident light ray deviations due to changes in the index of refraction is negligible.

While a sinusoidal rugate exhibits some harmonic suppression compared to comparable stacked single wavelength rejection filters, the harmonic content remains significant. In fact, it has been found that the conventional superimposing of the individual refractive index profiles does not seem to apply with respect to the rejection of the harmonics of the principle wavelength.

The rejection of harmonics is an important consideration regardless of the intended use of the rugate filter, however, it becomes extremely important when the rugate is used to reject laser light of known wavelengths. The rejection of laser light is important for both domestic and military applications.

The problem of suppressing harmonics in rugates has been given much consideration in the art. For example, one approach has been to superimpose an elliptical function with the principle sinusoidal filter function. Such an approach is discussed in an article by W. H. Southwell, entitled "Rugate Index Profile Which Suppresses All Harmonic Stopbands", 1988 Technical Digest Series, Vol 6. However, this approach does not correct for what seem to be manufacturing anomalies that appear to be inherent in many rugate manufacturing processes. For example, it is not unusual to find strong harmonics even when the various corrective techniques have been implemented. Consequently, a rugate filter having suppressed harmonics is clearly desirable and needed.

SUMMARY OF THE INVENTION

Accordingly, it is one object of he present invention to provide a rugate filter that substantially completely overcomes the drawbacks of present rugate filters discussed above.

This object is accomplished, at least in part, by providing a rugate filter having an index of refraction versus optical thickness profile that effectively suppresses harmonics of the principle wavelength for which the filter is designed.

Other objects and advantages will become apparent to those skilled in the art from the following detailed description read in conjunction with the appended claims and the drawings attached hereto.

BRIEF DESCRIPTION OF THE DRAWINGS

The drawings, not drawn to scale, include.

DETAILED DESCRIPTION OF THE INVENTION

Figure 1:
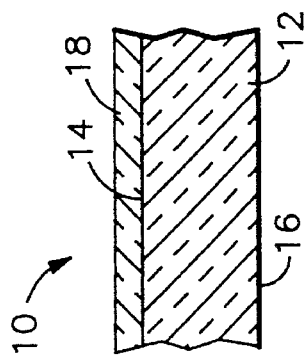
FIG. 1 which is a cross-sectional view of a rugate filter having suppressed harmonic and embodying the principles of the present invention.

A rugate filter, generally indicated at 10 in FIG. 1 and embodying the principles of the present invention, includes an optically transparent substrate 12 having first and second opposing surfaces, 14 and 16, respectively, and a layer 18 deposited on one of the surfaces, 14 or 16, of the optically transparent substrate 12. The layer 18 has an index of refraction versus optical thickness profile equal to the superposition of at least a principle sinusoidal index of refraction versus optical thickness profile and a secondary sinusoidal index of refraction versus optical thickness profile, the secondary index of refraction versus optical thickness profile being related to the principle sinusoid in amplitude, period and phase. In the preferred embodiment, the amplitude of the secondary profile is about 10% of the amplitude of the principle sinusoid, the period of the secondary profile being about one-half the wavelength of the principle, and the phase of the secondary profile being −90 degrees with respect to the principle sinusoid.

Figure 2:
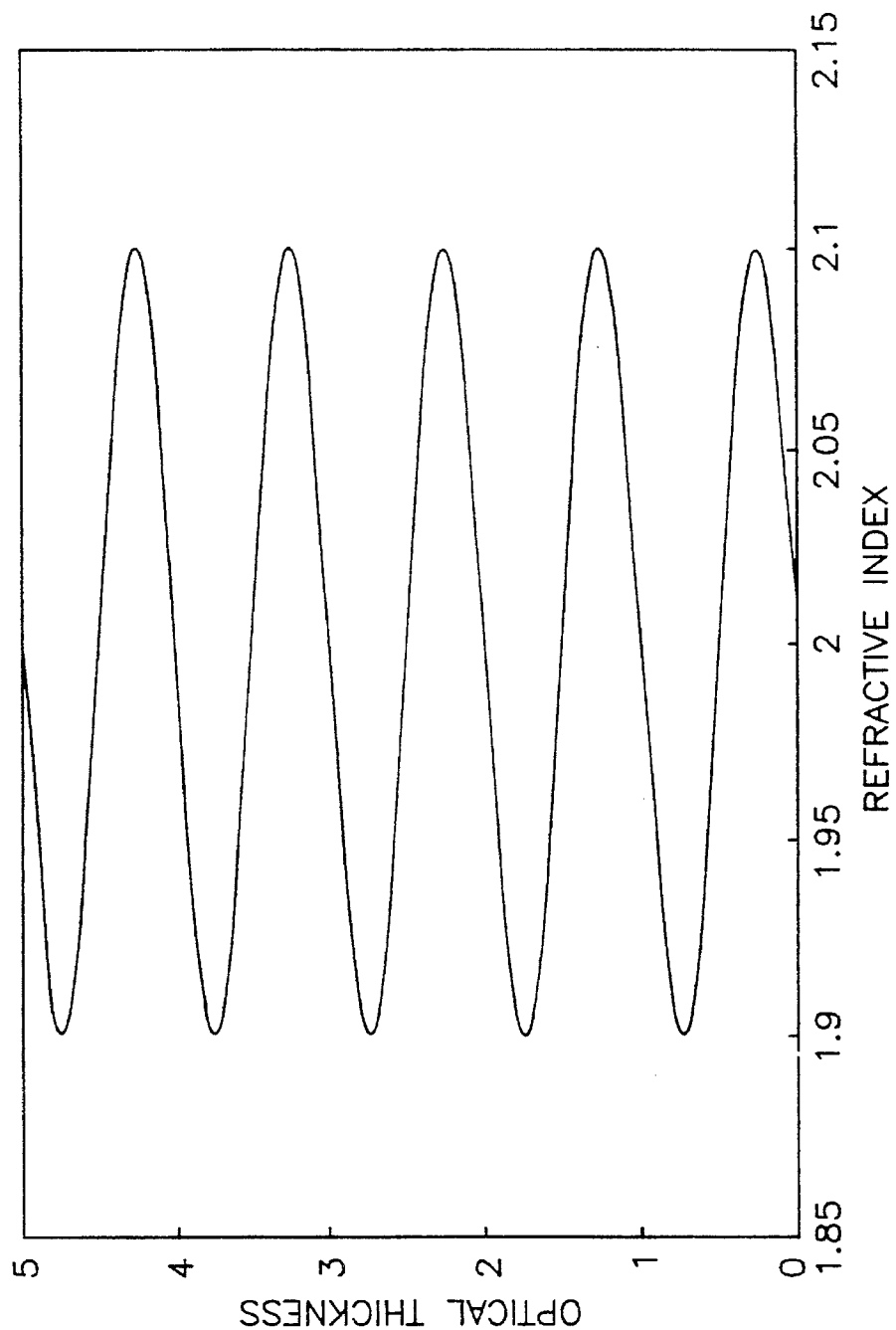
FIG. 2 which is an index of refraction versus optical thickness profile for the principle sinusoid of the rugate filter shown in FIG. 1.

As shown in FIG. 2, in one particular embodiment, the principle sinusoidal variation is designed to reject light having a reflection band centered at a wavelength of around 2 micrometers. For such an embodiment, the index of refraction versus optical thickness profile of the principle sinusoid is provided with about 30 full cycles to ensure that the principles wavelength is substantially completely rejected. Such a profile results in the layer 18 having a finished mechanical thickness of about 15 micrometers. In this particular embodiment, the principle sinusoid has an amplitude of about 0.1, that is, the index of refraction varies plus or minus 0.1 from the center index of refraction, which, in the embodiment shown in FIG. 2 is equal to 2. The principle sinusoid has a period of about 1 micrometer. The index of refraction versus optical thickness profile shown in FIG. 2, nonetheless, as discussed above, does not effectively reject the harmonics of the principle wavelength. That is, sufficient light at the second and third harmonics, i.e., at wavelengths of about 1.0 micrometers and 0.5 micrometers, respectively, is still not transmitted through the optical substrate 12 to render such a filter ineffective for many purposes.

Figure 3:
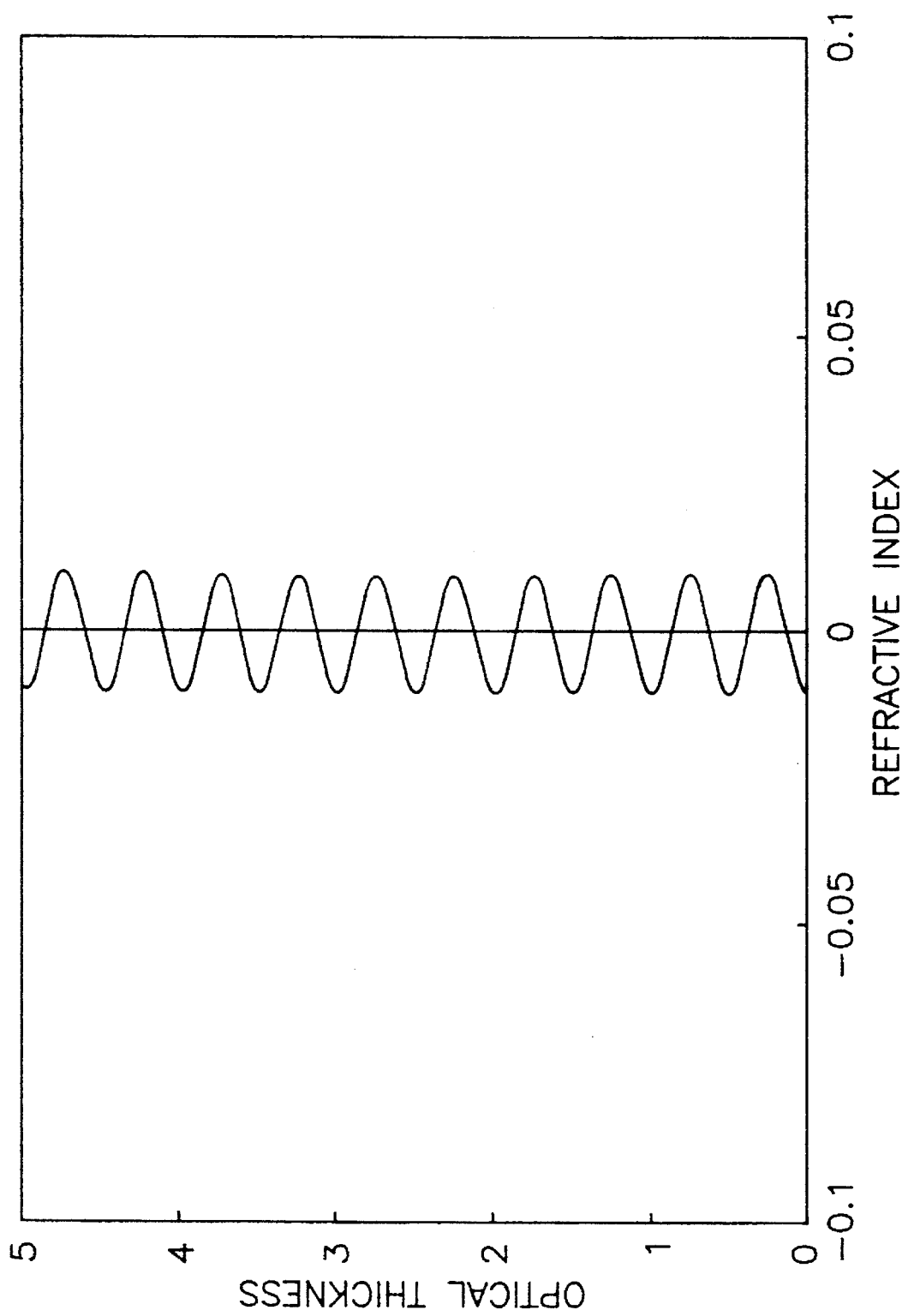
FIG. 3 which is an index of refraction versus optical thickness profile for the secondary sinusoid of the rugate filter shown in FIG. 1.

The secondary sinusoidal index of refraction versus optical thickness profile for the filter 10 of this specific embodiment is shown in FIG. 3. As shown therein, the secondary sinusoid has an amplitude on the order of about 10% of the amplitude of the principle sinusoid, in this embodiment, about 0.01. The period of the secondary sinusoid is about one quarter of the wavelength of the principle. However, it has been found that, for superimposition purposes, the secondary sinusoid should be superimposed, not in phase, as is considered conventional, but out of phase with the principle sinusoid by about −90 degrees.

Figure 4:
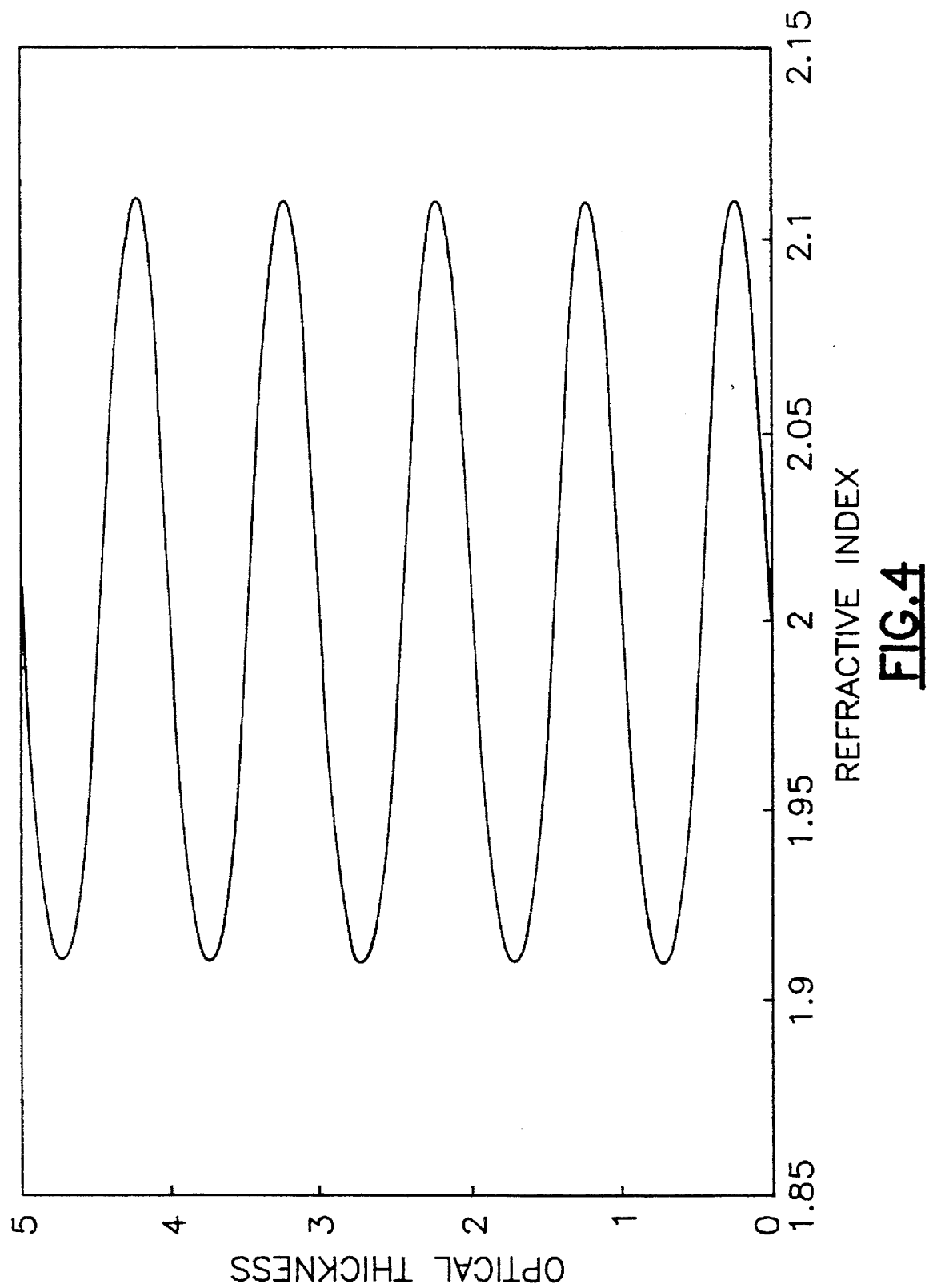
FIG. 4 which is an index of refraction versus optical thickness profile of the superposed profile of the rugate filter shown in FIG. 1.
Figure 5:
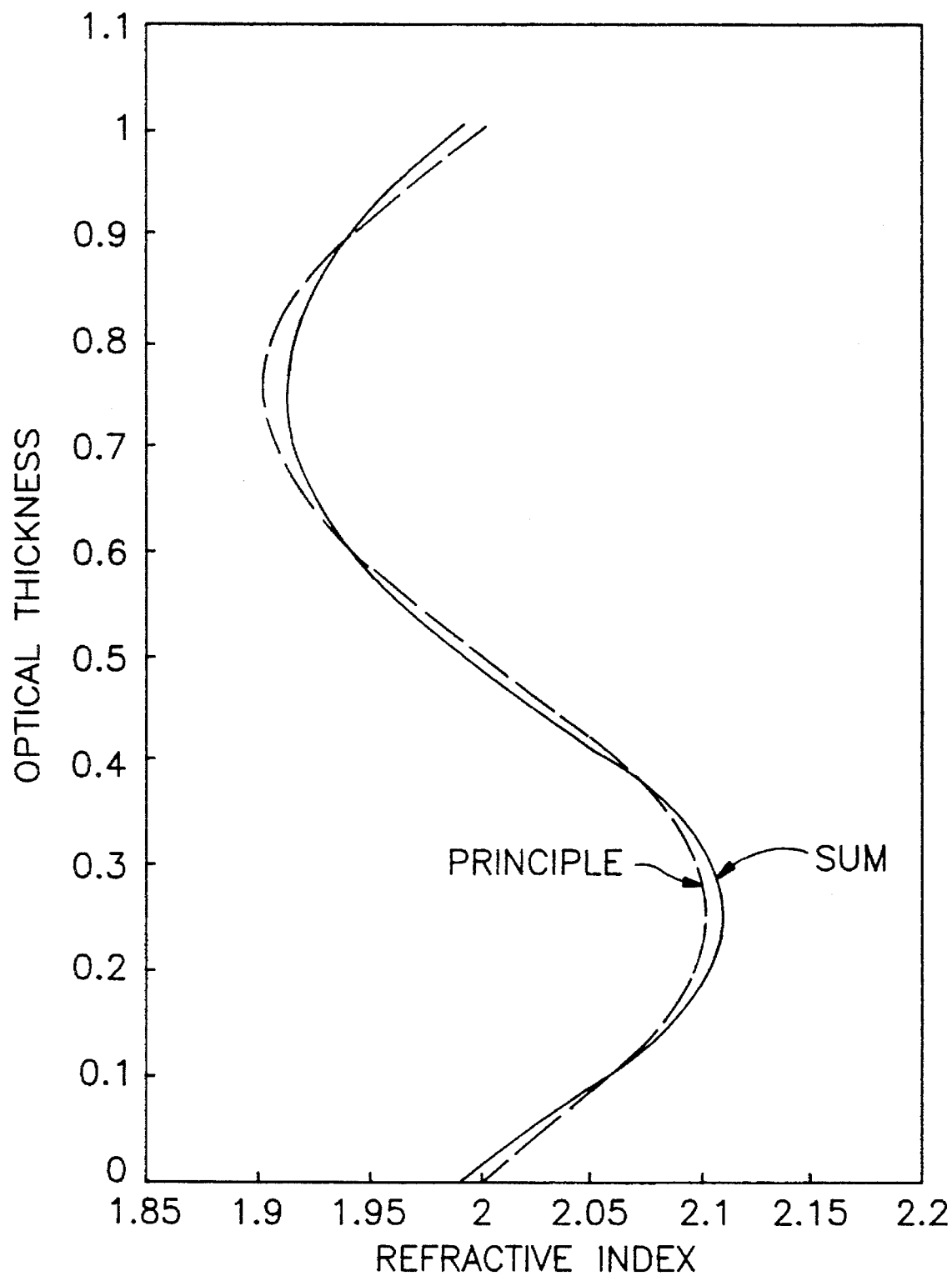
FIG. 5 which is an index of refraction versus optical thickness profile of a single cycle comparing the principle sinusoid with the superposed sinusoid.

Hence, by superpositioning the principle sinusoidal profile, shown in FIG. 2, and the secondary sinusoidal profile, shown in FIG. 3, the index of refraction versus optical thickness profile of the layer 18, shown in FIG. 4, is obtained. Although the superposed profile shown in FIG. 4 looks substantially identical to that of the principle sinusoid shown in FIG. 2, subtle differences are, in fact, introduced by the superpositioning of the profile shown in FIG. 3. Such differences can be more readily appreciated in the profile shown in FIG. 5. Therein, a single cycle of the principle sinusoid (shown in dashed lines) is compared with a single cycle of the superposed sinusoid (shown in a solid line).

It has been determined that by the use of such a superpositioning profile both the second harmonic and the third harmonic of the 2 micrometer principle wavelength are significantly reduced. For example, in one particular embodiment, the second harmonic, i.e., at about the 1.0 micrometer wavelength, was reduced by about 95%. Further, the third harmonic, i.e., at about the 0.5 micrometer wavelength has been reduced by about 90%. Thus, the comparatively small changes produced by the superpositioning described herein and clearly pointed out in FIG. 5, result in significantly suppressed harmonics.

Figure 6:
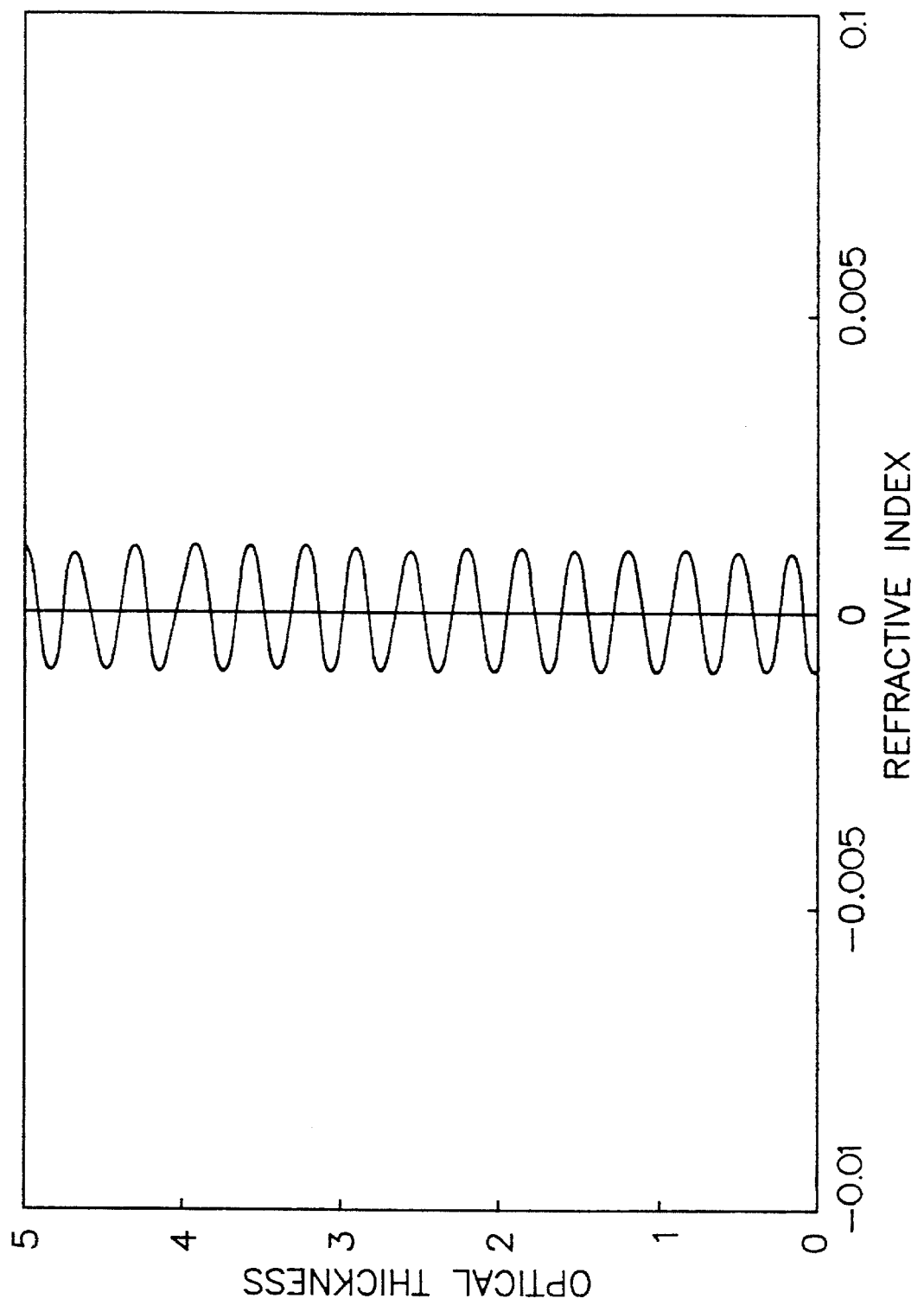
FIG. 6 which is an index of refraction versus optical thickness profile for a tertiary sinusoid for use with the rugate filter shown in FIG. 1.

Nonetheless, in some instances, the third harmonic may still be of sufficient magnitude that further filtering is desired. In such an instance, the layer 18 may be provided with an index of refraction versus optical thickness profile such as that shown in FIG. 6. Such a profile is then superimposed into the profile shown in FIG. 2 along with the profile for the suppression of the second harmonic shown in FIG. 3. Such a tertiary sinusoid preferably has an amplitude of about 1% of that of the principle sinusoid. The period of the tertiary profile is about one-sixth of the principle wavelength. The tertiary sinusoid is, preferably, superimposed about −60 degrees out of phase with respect to the principle sinusoid.

The filter 10 having suppressed harmonics can be fabricated from materials and by methods known is the rugate fabrication art.

Although the present invention has been discussed with respect to one or more specific embodiments it will be understood by those skilled in the art of rugates that other arrangements and configurations can also be generated that do not exceed the spirit and scope hereof. Hence, the present invention is deemed limited only by the appended claims and the reasonable interpretation thereof.

What is claimed is:

1. A rugate filter having suppressed harmonics comprising:

an optical substrate having a surface; and a layer of material on said surface, said layer having an index of refraction versus optical thickness profile that varies according to the superimposing of a principle sinusoid for rejection of a principle wavelength of optical radiation and a secondary sinusoid having an index of refraction versus optical thickness profile having an amplitude of about 10% of that of said principle sinusoid, and a phase difference of about −90 with respect to said principle sinusoid whereby filter harmonics of the principle wavelength are suppressed.

2. The rugate filter as claimed in claim 1 wherein said layer of material includes at least 30 cycles of said principle sinusoid.

3. The rugate filter as claimed in claim 1 wherein said secondary sinusoid has a period of about one half the wavelength of said principle sinusoid.

4. The rugate filter as claimed in claim 1 wherein said principle sinusoid has an amplitude of about 0.1.

5. The rugate filter as claimed in claim 4, wherein said principle sinusoid has a center index of refraction of about 2.

6. The rugate filter as claimed in claim 1 wherein said principle wavelength is about 2 micrometers.

7. The rugate filter as claimed in claim 6 wherein said layer has a mechanical thickness of about 15 micrometers.

8. The rugate filter as claimed in claim 1 further including a tertiary sinusoid superimposed with said principle sinusoid and said secondary sinusoid, said tertiary sinusoid having an amplitude of about 1% of said principle sinusoid.

9. The rugate filter as claimed in claim 8 wherein said tertiary sinusoid has a phase of about −60 degrees with respect to said principle sinusoid.

10. The rugate filter as claimed in claim 9 wherein said tertiary sinusoid has a period of about one-sixth the wavelength of said principle sinusoid.

11. A rugate filter having suppressed harmonics comprising:

an optical substrate having a surface; and a layer of material on said surface, said layer having an index of refraction versus optical thickness profile that varies according to the superimposing of a principle sinusoid for rejection of a principle wavelength of optical radiation and a secondary sinusoid having an index of refraction versus optical thickness profile and a phase difference of about −90 degrees with respect to said principle sinusoid for suppressing filter harmonics of the principle wavelength.

* * * * *